(12) United States Patent
Tripathi

(10) Patent No.: US 12,464,368 B2
(45) Date of Patent: Nov. 4, 2025

(54) SYSTEM AND METHOD FOR LICENSED SPECTRUM COORDINATION

(71) Applicant: Nishith Tripathi, Parker, TX (US)

(72) Inventor: Nishith Tripathi, Parker, TX (US)

(*) Notice: Subject to any disclaimer, the term of this patent is extended or adjusted under 35 U.S.C. 154(b) by 449 days.

(21) Appl. No.: 17/970,053

(22) Filed: Oct. 20, 2022

(65) Prior Publication Data

US 2023/0122884 A1 Apr. 20, 2023

Related U.S. Application Data

(60) Provisional application No. 63/257,968, filed on Oct. 20, 2021.

(51) Int. Cl.
*H04W 16/14* (2009.01)

(52) U.S. Cl.
CPC .................. *H04W 16/14* (2013.01)

(58) Field of Classification Search
CPC ....................................... H04W 16/14
USPC ........................................... 370/329
See application file for complete search history.

(56) References Cited

U.S. PATENT DOCUMENTS

| | | | | |
|---|---|---|---|---|
| 2002/0054574 A1* | 5/2002 | Beach | ............ | H04L 47/621 370/279 |
| 2004/0087324 A1* | 5/2004 | Ketchum | ............ | H04B 7/0669 455/67.11 |
| 2004/0198312 A1* | 10/2004 | Jarett | ............ | H04L 51/00 455/12.1 |
| 2006/0028376 A1* | 2/2006 | Theobold | ............ | H04W 16/14 342/162 |
| 2006/0104205 A1* | 5/2006 | Strutt | ............ | H04L 45/26 370/342 |
| 2007/0047669 A1* | 3/2007 | Mak | ............ | H04B 1/28 375/316 |
| 2008/0062936 A1* | 3/2008 | He | ............ | H04W 72/12 370/338 |
| 2008/0107119 A1* | 5/2008 | Chen | ............ | H04L 47/786 370/395.21 |
| 2009/0122887 A1* | 5/2009 | Li | ............ | H04L 5/0046 375/260 |
| 2010/0103850 A1* | 4/2010 | Gossain | ............ | H04W 72/27 370/312 |
| 2010/0318454 A1* | 12/2010 | Warncke | ............ | G06Q 40/04 705/37 |
| 2014/0171018 A1* | 6/2014 | Elrefaey | ............ | H04W 16/04 455/406 |

(Continued)

*Primary Examiner* — Mark G. Pannell
(74) *Attorney, Agent, or Firm* — Barry Choobin; Patent 360

(57) ABSTRACT

A system and method for maximizing the use of licensed spectrum between spectrum owners and spectrum seekers. The method includes the receiving profiles from the spectrum owners and the spectrum seekers, wherein the profiles of the spectrum owners have characteristics or conditions associated with the spectrum usage by the spectrum seeker and the profiles of the spectrum seekers comprise characteristics or conditions associated with the spectrum usage accepted by the spectrum seekers. Based on the profiles, spectrum owner-spectrum seeker pairs can be generated for the allocation of an available spectrum chunk to one or more spectrum seekers. Negotiations can be facilitated between the spectrum owners and seekers, wherein status updates for allocation of the available spectrum chunk are provided to the spectrum owners and seeker.

19 Claims, 8 Drawing Sheets

(56) References Cited

U.S. PATENT DOCUMENTS

| | | | |
|---|---|---|---|
| 2015/0023330 A1* | 1/2015 | Balian | H04W 74/06 |
| | | | 370/336 |
| 2015/0201360 A1* | 7/2015 | Ray Chaudhuri | H04W 36/302 |
| | | | 455/436 |
| 2016/0127913 A1* | 5/2016 | Li | H04W 72/0453 |
| | | | 370/329 |
| 2016/0295566 A1* | 10/2016 | Morper | H04W 72/04 |
| 2017/0272131 A1* | 9/2017 | Ananth | H04B 7/0413 |
| 2017/0364978 A1* | 12/2017 | Loeb | G06Q 30/08 |
| 2018/0092103 A1* | 3/2018 | Gurney | H04W 16/14 |
| 2019/0021011 A1* | 1/2019 | Zhang | H04W 16/14 |

* cited by examiner

SYSTEM AND METHOD FOR LICENSED SPECTRUM COORDINATION

CROSS-REFERENCE TO RELATED APPLICATIONS

This application claims priority from a U.S. Provisional Patent Appl. No. 63/257,968 filed on Oct. 20, 2021, which is incorporated herein by reference in its entirety.

FIELD OF INVENTION

The present invention relates to the technical field of wireless communications, and more particularly, the present invention relates to the efficient management of licensed spectrum in wireless communications.

BACKGROUND

Spectrum can be defined as a range of radio frequencies that wireless signals travel over. Availability of Spectrum thus becomes essential in wireless communications. Different types of spectrums are used for distinct types of wireless communications. For example, the spectrum may be unlicensed (i.e., license-exempt), licensed, or shared. Wi-Fi systems use unlicensed spectrum. Current cellular networks typically use the licensed spectrum to control interference but may have the capability to utilize the unlicensed spectrum on an opportunistic basis. Such cellular networks use the feature of Licensed-Assisted Access for LTE-based networks and NR-Unlicensed for 5G NR-based networks. Certain bands of the spectrum may be shared with pre-defined priority levels such that a lower-priority system can use the shared spectrum if a higher-priority system is not using such spectrum at a given instant. The Citizens Broadband Radio Service (CBRS) spectrum in the 3.5 GHz band is an example of such shared spectrum, where three priority levels are defined: Incumbent Access, Priority Access, and General Authorized Access.

Spectrum as a resource is limited in availability and thus requires allocation. However, the demand is increasing exponentially. A service provider obtains licensed spectrum from a suitable government agency (e.g., the FCC in the US) at a heavy cost. However, not all the licensed spectrum is used all the time in all geographic areas by a service provider due to a variety of reasons. The present infrastructure is unable to efficiently manage the available spectrum, which leads to operational losses and inferior quality of service.

A need is therefore appreciated for a system and method for efficiently managing the spectrum allocation.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to efficient utilization and sharing of available spectrum.

It is an object of the present invention to bridge the urban-rural Digital Divide and accelerate Non-Public Network (NPN) (e.g., enterprise network) deployments.

It is another object of the present invention to enhance sharing of the licensed spectrum between a Terrestrial Network (TN) operator and a Non-Terrestrial Network (NTN) operator.

It is still another object of the present invention to enable opportunistic content download/upload of content during traditional off-peak hours as well as traditional busy hours.

It is yet another object of the present invention to encourage deployment of community networks that address a variety of use cases including affordable or free access to wireless Internet to empower people with fewer financial means and enhanced well-being of the humanity and the planet through connectivity of diverse IoT devices (e.g., medical sensors and environmental and infrastructure sensors).

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

DETAILED DESCRIPTION

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form to facilitate describing the subject innovation. Moreover, the drawings may not be to scale.

Figure 1:
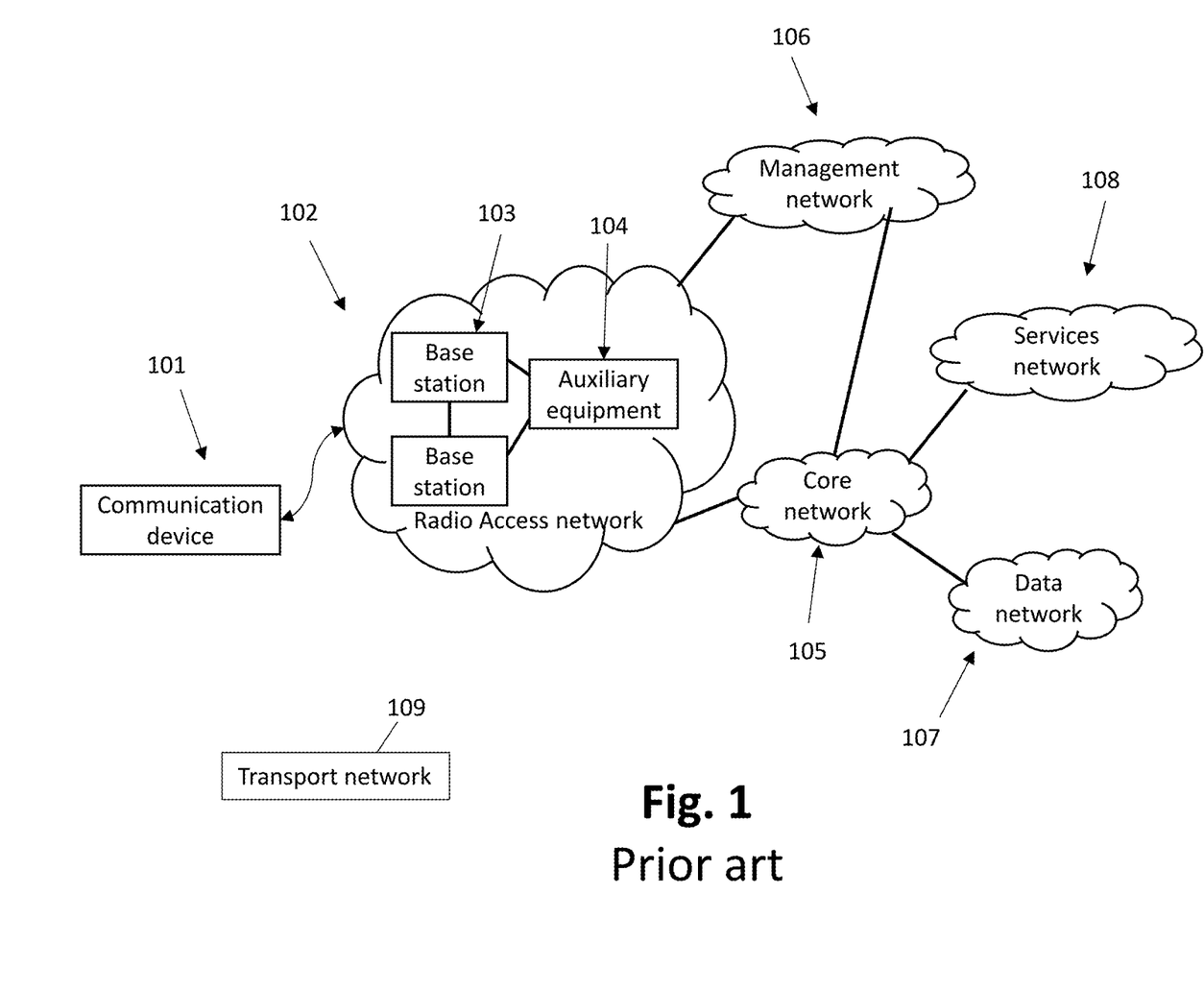
FIG. 1 is a block diagram illustrating a generic architecture of a wireless system, as known in the art.
Figure 2:
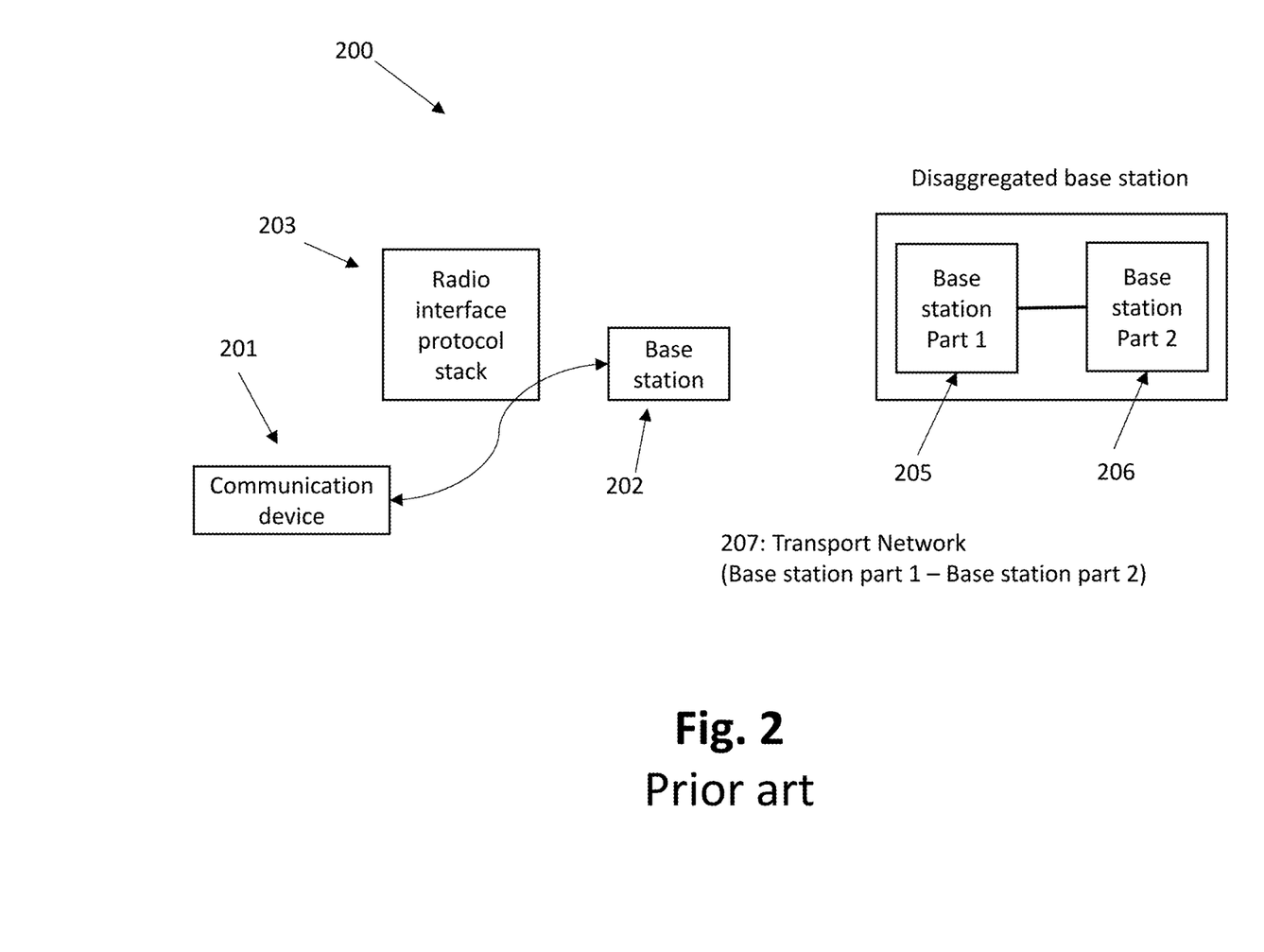
FIG. 2 shows the wireless communication between a base station and a communication device, as known in the art.
Figure 3:
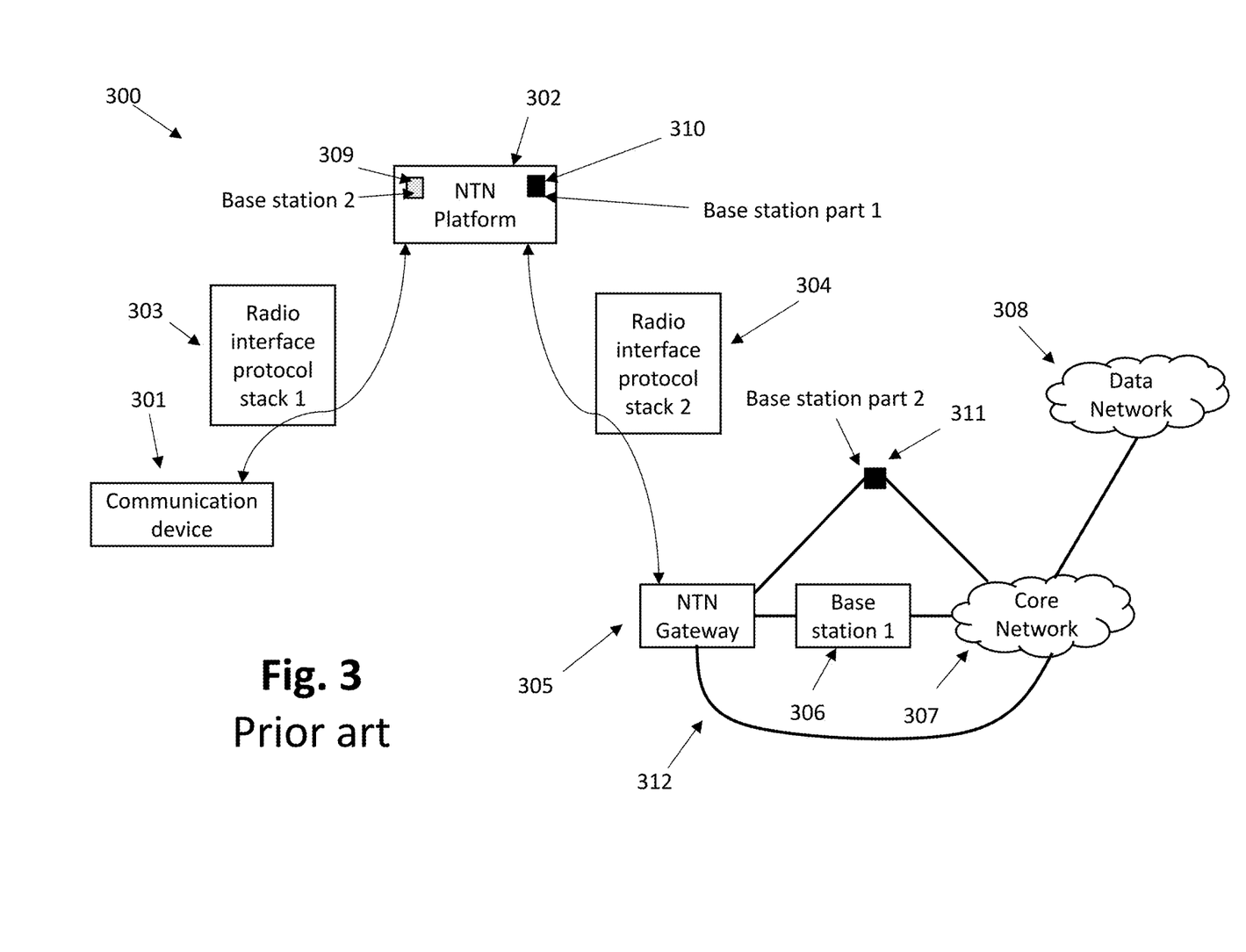
FIG. 3 shows an architecture of a Non-Terrestrial Network, as known in the art.

FIGS. 1-3 provide a general overview of the wireless system. FIG. 1 is a block diagram that illustrates the architecture of typical wireless communication. A typical wireless system 100 includes Communication Devices (CDs) 101, a Radio Access Network (RAN) 102, a Core Network 105, a Services Network 108, and a Management Network 106. The CD 101 communicates with a Base Station (BS) 103 of the RAN using a radio interface, leading to wireless communications. The CD is often referred to as a User Equipment (UE). Examples of UEs include a smartphone, a smartwatch, an Internet of Things (IoT) device, or a communications module in a system such as a self-driving car or an Augmented Reality (AR)/Virtual Reality (VR) headset. The RAN 102 consists of at least one or multiple BSs. BSs can often communicate with each other via a transport network 109 depending on the generation of the wireless technology. For example, the fourth generation (4G) Long Term Evolution (LTE) technology and the fifth generation (5G) technology utilize interfaces X2 and Xn for inter-BS communications, respectively. The BS is called an evolved Node B (eNodeB or eNB) in LTE and next-generation Node B (gNB) in 5G. The RAN usually includes auxiliary equipment 104 such as (i) battery backup to supply the BS with power when needed, (ii) cell site router (CSR) to connect the BS with other parts of the network such as the Core Network and the Management Network, and (iii) remote electrical tilt equipment to adjust the tilt of the BS antennas. The BS communicates with the CD using a technology-specific radio interface protocol stack.

The Core Network (CN) 105 consists of several network elements or network Functions (NFs). For example, a 4G LTE core network called the Evolved Packet Core (EPC) includes network elements or network nodes such as Mobility Management Entity (MME), Home Subscriber Server (HSS), Serving Gateway (S-GW), and Packet Data Network (PDN) Gateway (P-GW). A 5G core network called the Next Generation Core (NGC) or the 5G Core (5GC) includes NFs such as Access and Mobility Management Function (AMF), Session Management Function (SMF), Unified Data Management (UDM), and User Plane Function (UPF). The MME and the AMF maintain a Non-Access Stratum (NAS) signaling connection with the UE to exchange 4G/5G-specific signaling messages. The MME and the AMF also manage the UE mobility when the UE is in idle mode by keeping track of the geographic area (often called a Tracking Area (TA)) where the UE is to send a page message to the UE when needed. The HSS/UDM creates authentication credentials specific to the UE to facilitate the authentication of the UE by the network. The P-GW/SMF assigns an IP address to the UE. The P-GW/UPF interfaces with a Data Network 107 such as the Internet and an enterprise network.

The Services Network (SN) 108 provides operator-provided services. The IP Multimedia Subsystem (IMS) is an example of the SN. 4G and 5G provide voice services using the IMS.

The Management Network (MN) 106 manages the RAN 102 and the CN 105. An Operations, Administration, and Maintenance (OAM) system is an example of the MN. The MN can configure the BS and the NFs of the CN.

FIG. 2 illustrates the communication between the CD and the BS and the architecture of the BS. The CD 201 and the BS 202 communicate with each other using the technology-specific radio interface protocol stack 203 as shown in FIG. 2 designated as 200. For example, the UE and the eNB utilize an LTE-based radio interface protocol stack for communications on the LTE-Uu radio interface. Similarly, the UE and the gNB utilize a New Radio (NR)-based radio interface protocol on the NR-Uu radio interface. Both LTE radio interface protocol stack and 5G NR radio interface protocol stack have a physical (PHY) layer as Layer 1 protocol, Medium Access Control (MAC), Radio Link Control (RLC), and Packet Data Convergence Protocol (PDCP) as layer 2 protocols, and Radio Resource Control (RRC) as a layer 3 protocol. 5G NR introduces a new protocol called Service Data Adaptation Protocol (SDAP) compared to LTE. The PHY layer involves processing such as channel coding, modulation, scrambling, de-scrambling, demodulation, and decoding. The MAC layer/protocol at the BS implements a scheduler to allocate radio resources to the UE. The MAC layer also influences operations such as a random-access procedure. The MAC layer works with the PHY layer to implement the Hybrid-Automatic Repeat Request (H-ARQ) procedure that carries out fast retransmissions to minimize redundancy and maximize throughput (when configured). The RLC layer/protocol carries out retransmissions when the lower layers cannot recover packet errors (when configured). The PDCP layer/protocol performs header compression and supports security mechanisms such as ciphering (i.e., encryption) and integrity protection.

A BS may be implemented in a variety of ways. The BS may be monolithic, where tightly coupled custom hardware and custom (often proprietary) software are used. The BS may be disaggregated as shown in 204. For example, when a disaggregated BS has two parts, one part 205 may implement lower layers/protocols of the radio protocol stack and another part 206 may implement upper layers/protocols of the radio protocol stack.

In one example architecture of a disaggregated BS, Base Station Part 1 205 implements all layer 3 and layer 2 protocols and the baseband portion of the PHY layer. Base Station Part 2 206 implements the Radio Frequency (RF)

processing portion of the PHY layer. Such Base Station Part 2 is often referred to as Remote Radio Head (RRH) or Remote Radio Unit (RRU). A Centralized RAN (C-RAN) centralizes Base Station Parts 1 of multiple BSs at a relatively central location to derive cost and efficiency benefits.

In another example architecture of a disaggregated BS, Base Station Part 1 implements upper layers/protocols of the radio protocol stack such as RRC, SDAP, and PDCP, while Base Station Part 2 implements lower layers/protocols of the radio protocol stack such as RLC, MAC, and PHY. In such architecture, Base Station Part 1 is often called a gNB-Central Unit (gNB-CU), and Base Station Part 2 is often called a gNB-Distributed Unit (gNB-DU) for a disaggregated gNB in 5G NR. In practice, Base Station Part 2 may be further divided into a baseband processing unit and an RF processing unit.

A Terrestrial Network (TN) has its BSs on the ground. In contrast, a Non-Terrestrial Network (NTN) has some radio equipment at an altitude of more than few kilometers (e.g., on a satellite). FIG. 3 shows an example of an NTN architecture 300. Examples of an NTN platform in FIG. 3 (denoted by "300") include a satellite and a High-Altitude Platform Station (HAPS). Example satellites include Low Earth Orbit (LEO), Medium Earth Orbit (MEO), and Geostationary Earth Orbit (GEO). A satellite may be capable of generating one or more of these types of beams: Earth-fixed, Earth-moving, and quasi-Earth-fixed. An Earth-fixed beam covers a fixed geographic area on the Earth's surface all the time. An Earth-moving beam covers one geographic area at one instant and a different geographic area at another instant. A quasi-Earth-fixed beam covers one geographic area during one period (e.g., a few seconds or minutes) and a different geographic area during another period.

There are two main types of payloads in an NTN—a transparent payload and a regenerative payload. A transparent payload means that the entire BS equipment is on the ground and the NTN platform acts as a relay or a repeater. The transfer of user traffic for both types of payloads is briefly described below. For the network-to-the UE user traffic transfer in case of a transparent payload, the user traffic comes from the Data Network 308 to the Core Network 307. The Core Network 307 forwards the user traffic to Base Station 1 306. The Base Station 1 constructs a technology-specific signal such as an LTE signal or an NR signal for 4G and 5G, respectively. Such technology-specific signal is given to an NTN Gateway 305 that forwards the signal to the NTN Platform 302 using a Radio Interface Protocol Stack 2 labeled 304 on the Feeder Link. The NTN Platform performs tasks such as frequency conversion and power amplification and sends a signal to the CD 301 on Service Link or the Access Link. For the UE-to-network user traffic transfer in case of a transparent payload, the user traffic goes from the CD 301 to the NTN Platform 302 using a Radio Interface Protocol Stack 1 labeled 303 on the Service/Access Link. The NTN Platform performs tasks such as frequency conversion and power amplification and sends a signal to the NTN Gateway 305. The NTN Gateway 305 forwards the signal to Base Station 1 306. Finally, Base Station 1 306 forwards the user traffic to a suitable Data Network.

For a regenerative payload, two scenarios may exist. In one scenario, the entire BS 309 is on the NTN platform as shown in FIG. 3. In another scenario, Base Station Part 1 310 is on the NTN Platform and Base Station Part 2 311 is on the ground.

Consider the network-to-the UE user traffic transfer in case of a regenerative payload with the entire BS 309 on the NTN platform. The user traffic comes from Data Network 308 to Core Network 307. The Core Network 307 forwards the user traffic to the NTN Gateway 305 via connection 312. The NTN Gateway 305 forwards the user traffic to the NTN Platform 302 using a Radio Interface Protocol Stack 2 labeled 304 on the Feeder Link. The BS 309 performs technology-specific processing. The NTN Platform performs tasks such as power amplification and sends the user traffic to the CD 301 on Service Link or the Access Link.

For UE-to-the network user traffic transfer in case of a regenerative payload with the entire BS 309 on the NTN platform. The user traffic goes from the CD 301 to the NTN Platform 302 using a Radio Interface Protocol Stack 1 labeled 303 on the Service/Access Link. The NTN Platform sends the signal received from the CD to BS 309. The BS 309 performs technology-specific processing. The NTN Platform sends the signal via the Feeder Link to the NTN Gateway 305, which forwards the signal to the Core Network 307 via connection 312. Finally, Core Network 307 forwards the user traffic to a suitable Data Network.

For the network-to-the UE user traffic transfer in case of a regenerative payload with Base Station Part 1 310 on the NTN Platform and Base Station Part 2 311 on the ground, the user traffic comes from Data Network 308 to Core Network 307. The Core Network 307 forwards the user traffic to the Base Station Part 2 311, which performs technology-specific processing and conveys the user traffic to the NTN Gateway 305. The NTN Gateway 305 forwards the user traffic to the NTN Platform 302 using a Radio Interface Protocol Stack 2 labeled 304 on the Feeder Link. Base Station Part 1 310 performs technology-specific processing. The NTN Platform performs tasks such as power amplification and sends the user traffic to the CD 301 on Service Link or the Access Link.

Now, consider the UE-to-the network user traffic transfer in case of a regenerative payload with Base Station Part 1 310 on the NTN Platform and Base Station Part 2 311 on the ground. The user traffic goes from the CD 301 to the NTN Platform 302 using a Radio Interface Protocol Stack 1 labeled 303 on the Service/Access Link. The NTN Platform sends the signal received from the CD to Base Station Part 1 310. Base Station Part 1 310 performs technology-specific processing. The NTN Platform sends the signal via the Feeder Link to the NTN Gateway 305, which forwards the signal to Base Station Part 2 311. Base Station Part 2 311 performs technology-specific processing and sends the user traffic to Core Network 307. Finally, Core Network 307 forwards the user traffic to a suitable Data Network.

Figure 4:
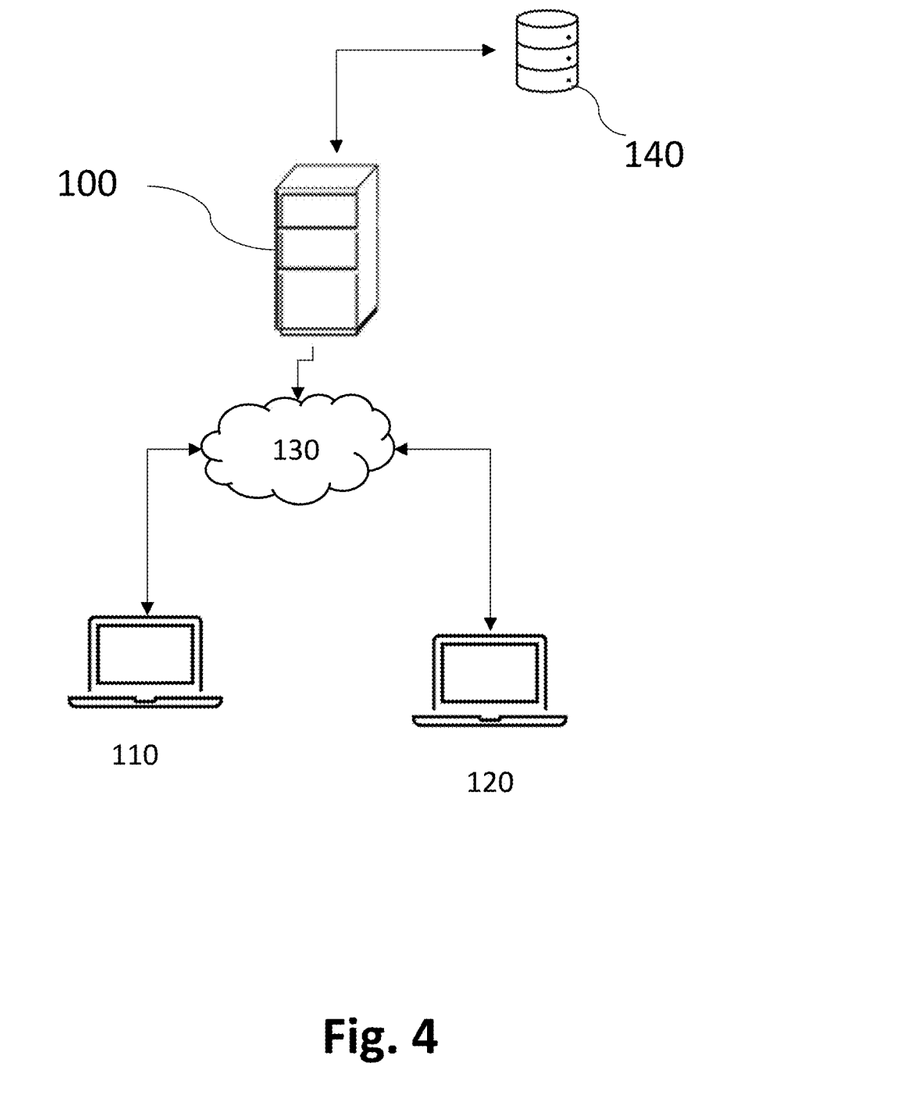
FIG. 4 is a block diagram showing an environment of the Licensed Spectrum Coordination System (LSCS), according to an exemplary embodiment of the present invention.

Disclosed is a Licensed Spectrum Coordination System (LSCS) for dynamically maximizing the use of the licensed spectrum through coordination between the entities that own the licensed spectrum and the entities that seek the licensed spectrum. Referring to FIG. 4 is a block diagram showing an environment of the Licensed Spectrum Coordination System (LSCS) 100. The Licensed Spectrum Coordination System 100 can communicate with a spectrum owner device 110 and a spectrum seeker device 120 through a network 130. The network can be a wired network, a wireless network, or a combination of wireless and wired networks. The spectrum owners can be entities that have spectrum that they are willing to lend. Such entities can be business entities, for example, cellular service providers. Spectrum seekers can be entities that would like to borrow the spectrum. Spectrum seekers can make use of borrowed spectrum during suitable periods to provide enhanced services to their subscribers. Spectrum owners can create an additional revenue stream by lending the spectrum of their choice to spectrum seekers.

Spectrum seekers can also be business entities, such as cellular service providers. In certain implementations, the spectrum seeker and the spectrum owner can be different business entities. The same business entity may act as the spectrum seeker during one period and/or in one geographic area and may act as the spectrum owner during another period and/or in another geographic area.

In certain implementations, the infrastructure providers, such as RAN or BS providers or owners, and the spectrum owners can be the same. In another embodiment, infrastructure providers or owners (e.g., RAN or BS providers or owners) and the spectrum owners can be different entities. Still, in an alternate embodiment, the infrastructure providers can interface with spectrum owners so that they can convey the available spectrum to spectrum owners.

In an embodiment of the disclosure, infrastructure providers or owners (e.g., RAN or BS providers or owners) and Spectrum Seekers are the same. In another embodiment of the disclosure, infrastructure providers or owners (e.g., RAN or BS providers or owners) and Spectrum Seekers are different entities and infrastructure providers or owners interface with Spectrum Seekers so that they can make use of the spectrum obtained by Spectrum Owners.

The disclosed system 100 can also be connected to one or more databases 140. One or more databases can include internal databases that may be a part of the disclosed system or external databases. The system can connect to different external databases through the network. One or more databases can include information about legacy users of the band and/or scientific users of the band. One database may include information about the legacy users, another database may include information about passive receivers, and yet another database may include information about the NTN platform's orbital parameters including ephemeris data. Databases can also contain orbital parameters or orbital models. The databases can also include the capabilities of relevant satellites. Certain information can be collected by the disclosed system while certain information can be provided by third parties which is accessible to the disclosed system. One or more databases may also include a database of passive user locations and antenna configurations.

Figure 5:
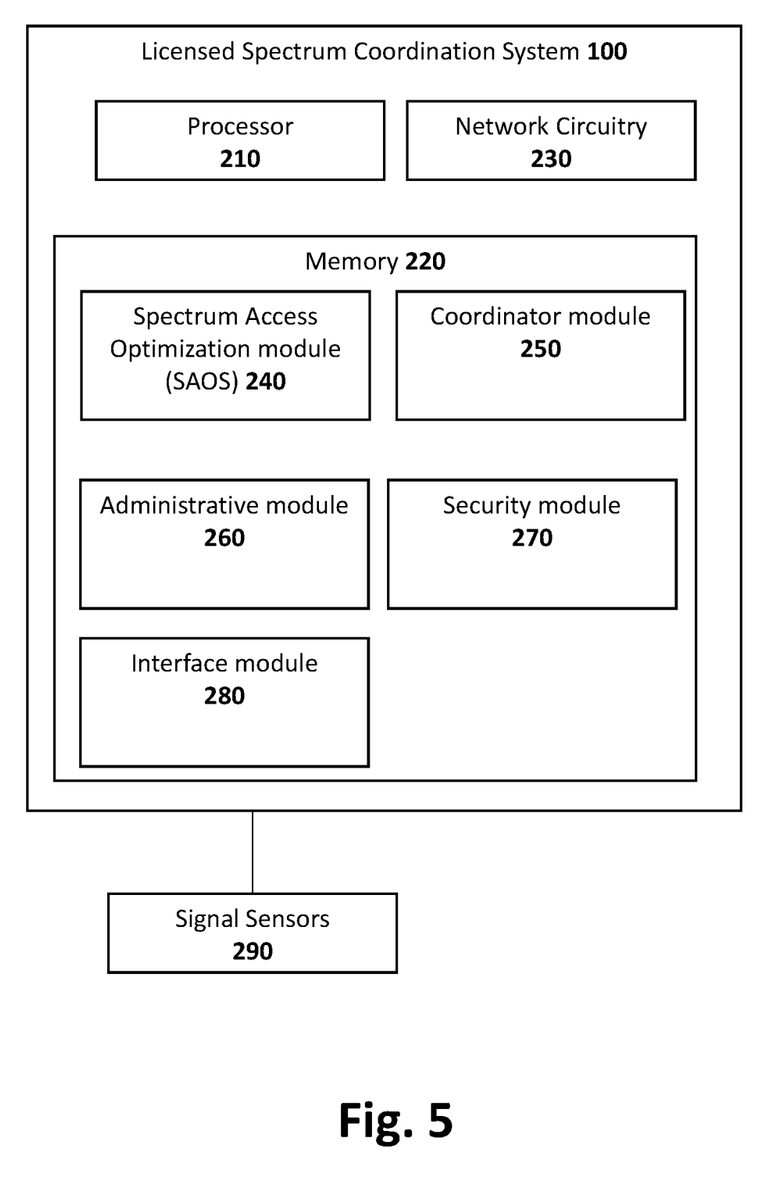
FIG. 5 is a block diagram of a Licensed Spectrum Coordination System (LSCS), according to an exemplary embodiment of the present invention.

Referring to FIG. 5 is a block diagram for the disclosed licensed spectrum coordination system (LSCS) 100. The system can include a processor 210 and a memory 220. The processor can be any logic circuitry that responds to, and processes instructions fetched from the memory. The memory may include one or more memory chips capable of storing data and allowing any storage location to be directly accessed by the processor. The memory includes modules according to the present invention for execution by the processor to perform one or more steps of the disclosed methodology. The system may also include network circuitry for connecting to external networks, such as network 130.

The disclosed system can include a spectrum access optimization module (SAOS) 240, a coordinator module 250, an administrative module 260, a security module 270, and an interface module 280. The modules, upon execution, performs one or more steps of the disclosed methodology. The modules can be viewed as logical functions or Network Functions and can be implemented in separate physical pieces of equipment, or one physical equipment can implement multiple modules. The disclosed system can also include signal sensors 290. The spectrum access optimization module (SAOS) 240 can receive information about the availability of spectrum from spectrum owner devices 110 and can also determine the needs of a spectrum from spectrum seeker devices 120. The spectrum access optimization module 240 based on the said information can generate spectrum owner-spectrum seeker pairs. The coordinator module 250 can facilitate coordination among various instances of the SAOS. The signal sensors 290 deployed at suitable locations can report the Rise over thermal (RoT) or total received signal strength (RSS) per MHz (or another suitable frequency unit) for spectrum chunks to the SOAS to enable the SOAS to decide about the number of spectrum seekers that could use the spectrum in a non-exclusive manner in each geographic area within a given period. The interface module 280 can provide suitable interfaces on the different devices that allow users of the disclosed system to interact or communicate with the disclosed system. The administrative module 260 can allow administrators of the disclosed system to communicate with the disclosed system and provide various configurations for the system. The security module 270 can provide for secure connections among spectrum owner devices, spectrum seeker devices, one or more databases, the signal sensors, SAOS, and SAOS coordinators.

Figure 6:
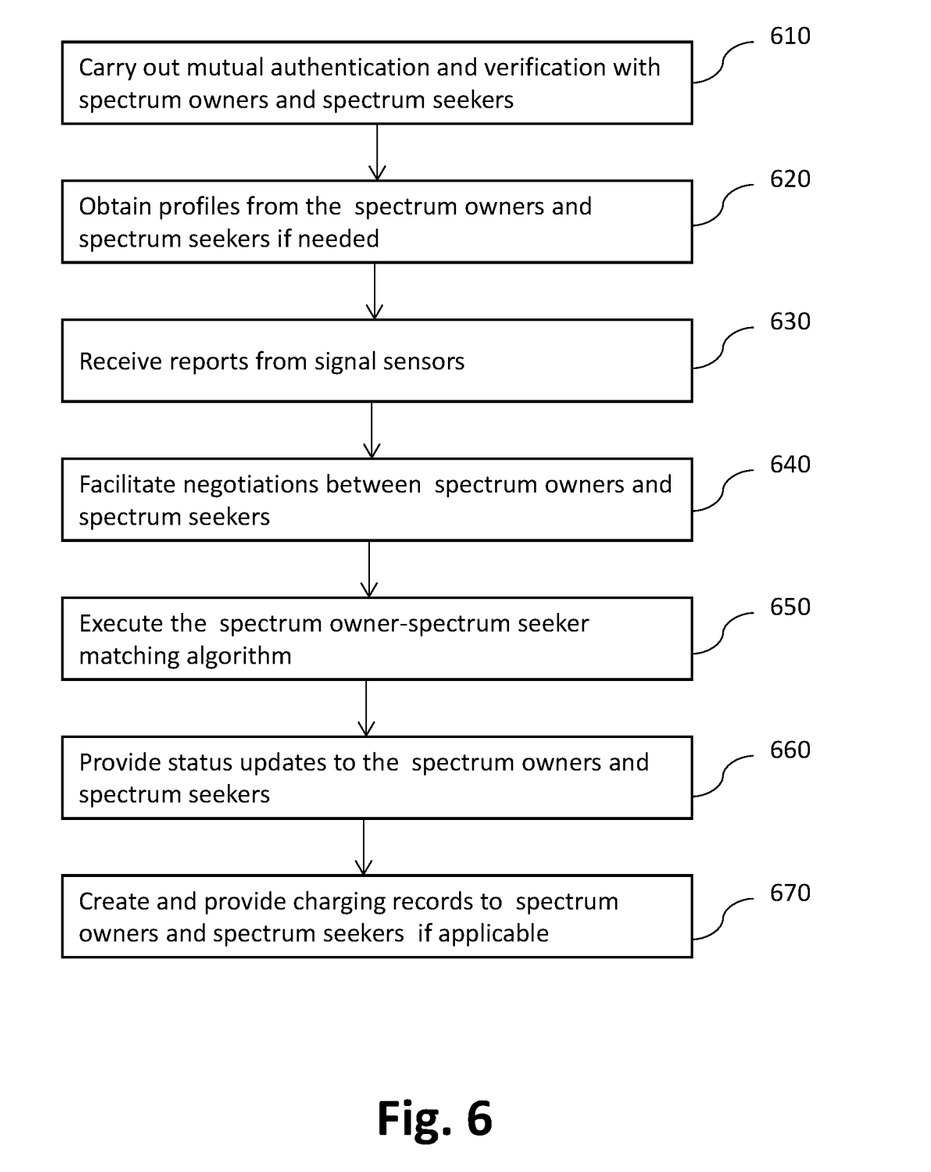
FIG. 6 is a flow chart illustrating an exemplary embodiment of the spectrum access optimization module (SAOS), according to the present invention.

FIG. 6 is a flow chart that illustrates an exemplary embodiment of the spectrum access optimization module (SAOS) 240. The spectrum access optimization module (SAOS) 240, upon execution, can receive information about the availability of spectrum from spectrum owner devices 110 and can also determine the needs of a spectrum from spectrum seeker devices 120. The spectrum access optimization module 240 based on the said information can generate spectrum owner-spectrum seeker pairs. The SAOS can also obtain spectrum utilization reports from signal sensors to determine the pairs. The SAOS can enable opportunistic content download/upload of content during traditional off-peak hours as well as traditional busy hours. The licensed spectrum assigned by SAOS to commercial community network operators can help bridge the urban-rural Digital Divide and accelerate Non-Public Network (NPN) (e.g., enterprise network) deployments. The SAOS can also convey spectrum assignment decisions to spectrum owners and spectrum seekers via status updates. The SAOS can also facilitate any applicable charging per the agreed-upon charging policy. The SAOS can be implemented as centralized architecture or distributed architecture or can be mobile. In certain implementations, the SAOS can enable sharing of the licensed spectrum between a Terrestrial Network (TN) operator and a Non-Terrestrial Network (NTN) operator.

FIG. 6 shows steps carried out by the SOAS in an example embodiment of the disclosure to maximize the use of the licensed spectrum and the priority-access spectrum dynamically and flexibly. First, the Spectrum Owners and Spectrum Seekers can register with the disclosed system, at step 610. The spectrum access optimization module 240 can provide a suitable interface through interface module 280 for receiving information. The spectrum access optimization module 240 can also provide for authentication of the spectrum owners and spectrum seekers. The spectrum access optimization module 240 can also verify the classification of spectrum seekers such as a community network operator or a public service network operator to support differentiated billing and differentiated spectrum grant per spectrum usage conditions of spectrum owners. For authentication and verifications, the spectrum access optimization module 240 can obtain information from the security module 270.

Thereafter, the spectrum access optimization module 240 can obtain profiles from spectrum owners and spectrum seekers. For example, the spectrum access optimization module 240 may ask Spectrum Owners and Spectrum Seekers to provide profiles periodically or based on an event. In an example implementation, the SAOS obtains initial profiles from Spectrum Owners and Spectrum Seekers after mutual authentication and when the verification of seeker classification has been completed. In another example implementation, when a Spectrum Owner or a Spectrum Seeker wants to update its profile, such update is received by the spectrum access optimization module 240.

In certain implementations, the spectrum access optimization module 240 can obtain from the spectrum owner and a spectrum seeker one or more of the following profiles: Spectrum Profile, Spectrum Access Profile, Time Profile, Cost Profile, Seeker Profile, Interference Profile, Deployment Profile, and Geography Profile. The profiles provided by the spectrum owner are the available profiles that provide characteristics or conditions associated with the spectrum usage by spectrum seekers. The profiles provided by the spectrum seeker are the profiles that are being requested or accepted by the spectrum seeker.

Deployment Profile specifies the type of network deployment where the acquired spectrum can be used by the spectrum seeker. Examples of such deployment scenarios include indoor—home, indoor—building, indoor—large convention hall, outdoor—"local" area (e.g., an area equivalent to a hexagonal cell with tens of meters or a couple of hundred meters of cell radius), outdoor—wide area (e.g., an area equivalent to a hexagonal cell with more than a couple of hundred meters of cell radius), NTN-GEO, NTN-MEO/-LEO with quasi-Earth-fixed beam, NTN-LEO/-MEO with Earth-moving beams, NTN-HAPS, indoor—industrial (e.g., a factory), outdoor—industrial-open space, and outdoor—industrial-subterranean (e.g., mining). These deployment scenarios have different geographical coverage and signal strength characteristics.

The Spectrum Access Profile specifies how the acquired spectrum can be accessed by the spectrum seeker-exclusive access (i.e., no other spectrum seeker would use the obtained spectrum in the target geographic area during the specified period) or non-Exclusive Access (i.e., another spectrum seeker may also use the obtained spectrum in the target geographic area during the specified period). For example, the non-exclusive spectrum access may be used by community networks or public service networks. In certain embodiments, the Spectrum Access Profile can specify if Spectrum Owner/Seeker allows/supports the revocation or cancellation.

The Interference Profile can include an interference model such as a model that provides the likelihood of spectrum occupancy. In certain embodiments, the spectrum owner specifies the Rise-over-Thermal (RoT) threshold for non-exclusive spectrum usage and spectral emission masks for the transmit power in the Interference Profile. Spectrum seekers are responsible to meet the specified interference threshold and spectral emission masks.

The cost Profile can be provided by the spectrum owners which may contain the expected charges for the spectrum used to be paid by the spectrum seekers. In one implementation, the charges may be specified as $X per MHz per unit time for a period ranging from t1 to t2. The charges could be different for different types of spectrum seekers (see the "Seeker Profile" below). In an example implementation, the charges could be low for a community network operator and zero for a public service network operator.

The Spectrum Profile includes specifics about the spectrum chunks potentially available to spectrum seekers. In an example implementation, the specific spectrum chunks are represented in a compact manner by using some bits for high-level classification (e.g., sub-7 GHz, mmW spectrum, and THz spectrum), some bits to identify spectrum chunks, some bits to specify the start frequency and the end frequency for the spectrum chunk. The spectrum chunk may also be represented by one frequency offset (to the start or the middle of the spectrum chunk) and the bandwidth of the spectrum chunk.

The Time Profile specifies the period (e.g., instant t1 to instant t2) during which the spectrum can be used by the spectrum seeker. The Time Profile supports various time scales such as minutes, hours, days, weeks, or indefinite until removed. The spectrum reservation may be a one-time reservation or may have a certain periodicity (e.g., 6 hours every night from 12 midnight to 6 am).

The Time Profile also specifies the need and support for a keep-alive mechanism where the Spectrum Seeker sends a period update to the Spectrum Owner through the SAOS. If a configurable number of periodic keep-alive updates is missed (e.g., 3), the spectrum allocation can be revoked or canceled implicitly. In an example implementation, a suitable timer can be set at Spectrum Seeker such that the absence of an acknowledgment (by the Spectrum Owner/SAOS) to the keep-alive message for a configured number of times (e.g., 3) results in an implicit release of the spectrum allocation at the Spectrum Seeker.

The Seeker/Owner Profile specifies the classification of the spectrum seeker/owner. Example classifications of the spectrum seeker/owner include a nationwide operator, regional/local operator, rural operator, NPN/enterprise operator, community network operator, public service network operator, and scientific user. In an example implementation, a spectrum owner that is a nationwide operator may allow its spectrum to be used by some classes of a spectrum seeker but no other classes of a spectrum seeker.

The Geography Profile identifies the geographic area where the spectrum can be accessed (e.g., county name). Such areas may be represented in a compact format (e.g., using a hierarchy of areas such as a state, a county, and a region within a county).

The spectrum access optimization module 240 can receive reports from the signal sensors 290 based on the reporting configuration that the spectrum access optimization module 240 has specified for signal sensors 290, at step 630. For example, the spectrum access optimization module 240 may configure signal sensors 290 to provide reports on RoT periodically or when the RoT exceeds a threshold per specific spectrum chunk. Such RoT reporting can be used by the spectrum access optimization module 240 to allocate a given spectrum chunk to multiple spectrum seekers in an example mode of spectrum usage. The signal sensors 290 deployed at suitable locations report the Rise over thermal (RoT) or total received signal strength (RSS) per MHz (or another suitable frequency unit) for spectrum chunks (possibly in a compact manner) to the spectrum access optimization module 240 to enable the spectrum access optimization module 240 to decide about the number of spectrum seekers that could use the spectrum in a non-exclusive manner in each geographic area within a given period.

At step 640, the spectrum access optimization module 240 can facilitate negotiation between Spectrum Owners and Spectrum Seekers if such negotiation is supported by entities of the disclosed system. Based on the negotiation, the respective profiles can be updated and used by the disclosed spectrum access optimization module 240. In the absence of such negotiation, the spectrum access optimization module 240 utilizes the latest applicable profiles of Spectrum Owners and Spectrum Seekers.

At step 650, the spectrum access optimization module 240 can execute the Spectrum Owner-Spectrum Seeker matching algorithm to determine the allocation of an available spectrum chunk to one or more Spectrum Seekers. The spectrum access optimization module 240 can utilize a mechanism and a spectrum objective function (SOF) that can be maximized or minimized to meet objectives such as ensuring fair access to the spectrum, maximizing the spectrum utilization, and increasing the potential for finding matches between Spectrum Owners and Spectrum Seekers. The SOF is a function of input variables:

$$SOF=f(iv(i)) \tag{1}$$

Wherein, iv(i) is an $i^{th}$ normalized input variable.
In an example implementation, the function SOF is defined as $$SOF=\text{Sum}[c(i)*iv(i)] \tag{2}$$

wherein, "c(i)" is a coefficient associated with the $i^{th}$ normalized input variable iv(i). The index "i" ranges from 1 to N, wherein N is the number of input variables considered for the SOF. "c(i)" ranges from 0 to 1 and Sum[c(i)] is 1.0. For example, in the case of N=2, SOF becomes $$SOF=[c(1)*iv(1)]+[c(2)*iv(2)] \tag{3}$$

In an example approach, an "iv" is related to the cost difference between the Spectrum Owner and Spectrum Seeker and the goal is to prefer or prioritize the least cost difference. In another example approach, an "iv" is related to the time when the spectrum was last allocated to the spectrum seeker, and the goal is to prefer or prioritize the Spectrum Seeker that has not been allocated a spectrum in the recent past.

In another implementation of the SOF, the function SOF is defined as a ratio with 0 or more input variables in the numerator (Case of 0: there could be "1" as the numerator with no input variable in the numerator, and, all input variables are in the denominator) and 0 or more input variables in the denominator (Case of 0: there could be "1" as the denominator with no input variable in the denominator, and, all input variables are in the numerator).

In step 660, the spectrum access optimization module 240 provides status updates to Spectrum Owners and Spectrum Seekers to inform them about the decisions it has made about the spectrum chunk allocation. The spectrum access optimization module 240 can use these update messages to convey spectrum availability and spectrum usage. The spectrum access optimization module 240 can facilitate the revocation or cancellation of previously allocated spectrum chunks by relaying related messages from one entity to another (e.g., Spectrum Owner to Spectrum Seeker and vice versa) if their profiles allow such revocation/cancellation. At step 670, the spectrum access optimization module 240 can create and provide charging records to Spectrum Owners and Spectrum Seekers based on the cost profiles (if applicable).

Figure 7:
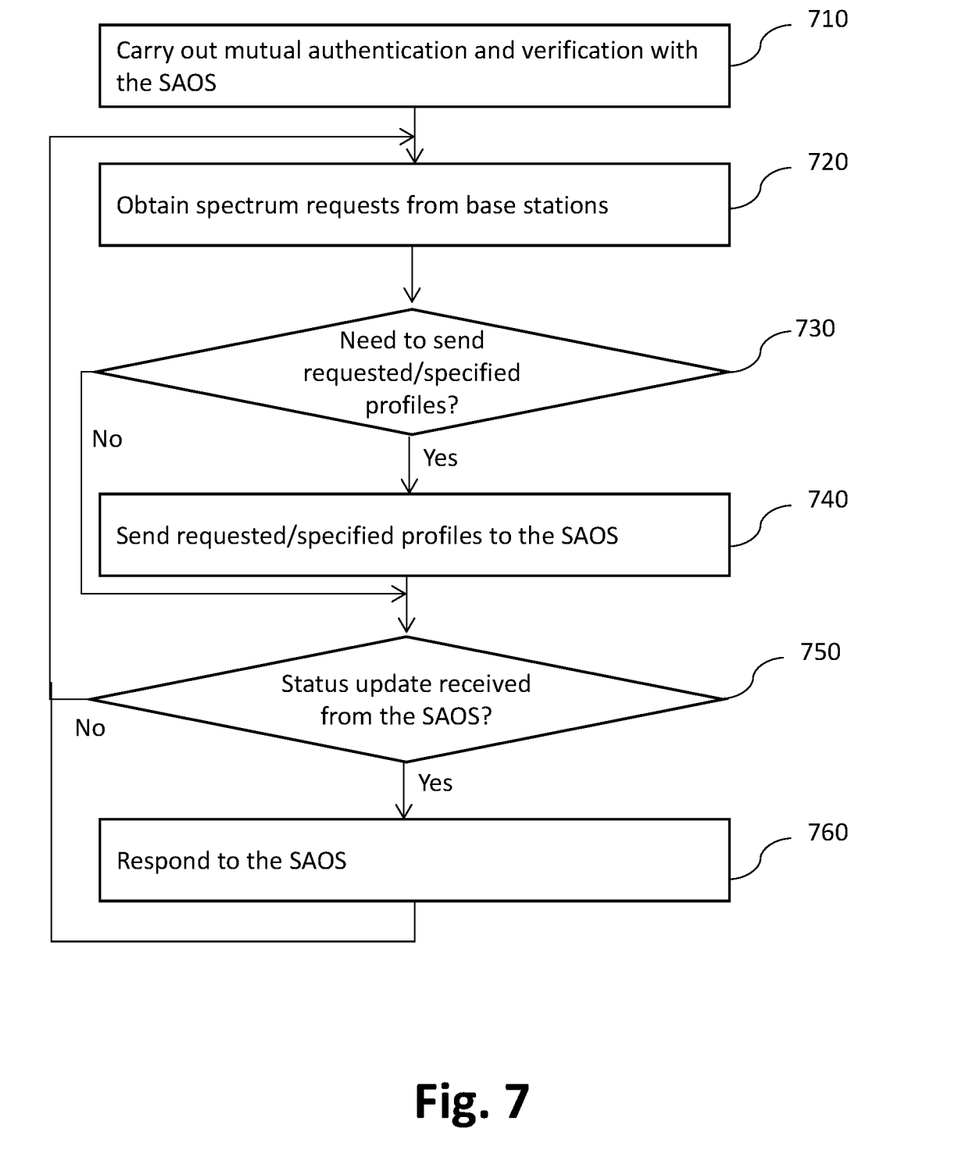
FIG. 7 is a flow chart showing the process at the spectrum seeker entity, according to an exemplary embodiment of the present invention.

Referring to FIG. 7 shows the processing carried out by the Spectrum Seeker in an example embodiment of the disclosure to maximize the use of the licensed spectrum and the priority-access spectrum dynamically and flexibly. At Step 710, in an embodiment of the disclosure, the Spectrum Seeker and the SAOS carry out mutual authentication. The Spectrum Owner also provides its classification (e.g., a nationwide operator, a community network operator, or a public service network operator) to the SAOS to support differentiated billing and differentiated spectrum grant per spectrum usage conditions of Spectrum Owners. In step 710, the Spectrum Seeker and the spectrum access optimization module 240 make use of the Security module 270 to help with authentication and fetching of relevant security information. Upon authentication, the Spectrum Seeker entity obtains spectrum requests or needs from one or more Base Stations in each geographic area such as an SMA, in step 720. In another implementation, the Spectrum Seeker entity determines the need for spectrum based on factors such as spectrum utilization for its Base Stations in the area, traffic demands, and planned services (e.g., broadcast or unicast of pre-recorded multimedia content).

In decision box 730, the Spectrum Seeker entity can check if there is a need to send requested/specified profiles to the spectrum access optimization module 240. In case, there is a need to send the profiles, the Spectrum Seeker entity can send the requested/specified profiles to the spectrum access optimization module 240. Examples of profiles include Spectrum Profile, Spectrum Access Profile, Time Profile, Cost Profile, Seeker Profile, Interference Profile, Deployment Profile, and Geography Profile.

When there is no need for the profiles at step 730 or when the spectrum access optimization module 240 has obtained the profiles in step 740, the Spectrum Seeker entity can check if it has received a status update from the spectrum access optimization module 240, at step 750. If no status update is received from the spectrum access optimization module 240, the Spectrum Seeker entity can continue receiving the spectrum usage from the base station in step 720. However, if a status update is received by the Spectrum Seeker entity from the spectrum access optimization module 240, at decision box 750, the Spectrum Seeker entity can respond to the spectrum access optimization module 240, at step 760. For example, the Spectrum Seeker entity may decide to send one or more updated profiles to the SAOS. The Spectrum Seeker may also decide to negotiate with the Spectrum Owner and send relevant profiles to the SAOS so that the SAOS can record those and forward the profiles to the Spectrum Owner. Upon responding at step 760, the Spectrum Seeker entity can continue to obtain spectrum requests or needs from one or more Base Stations as in step 720 and the above process can be repeated.

Figure 8:
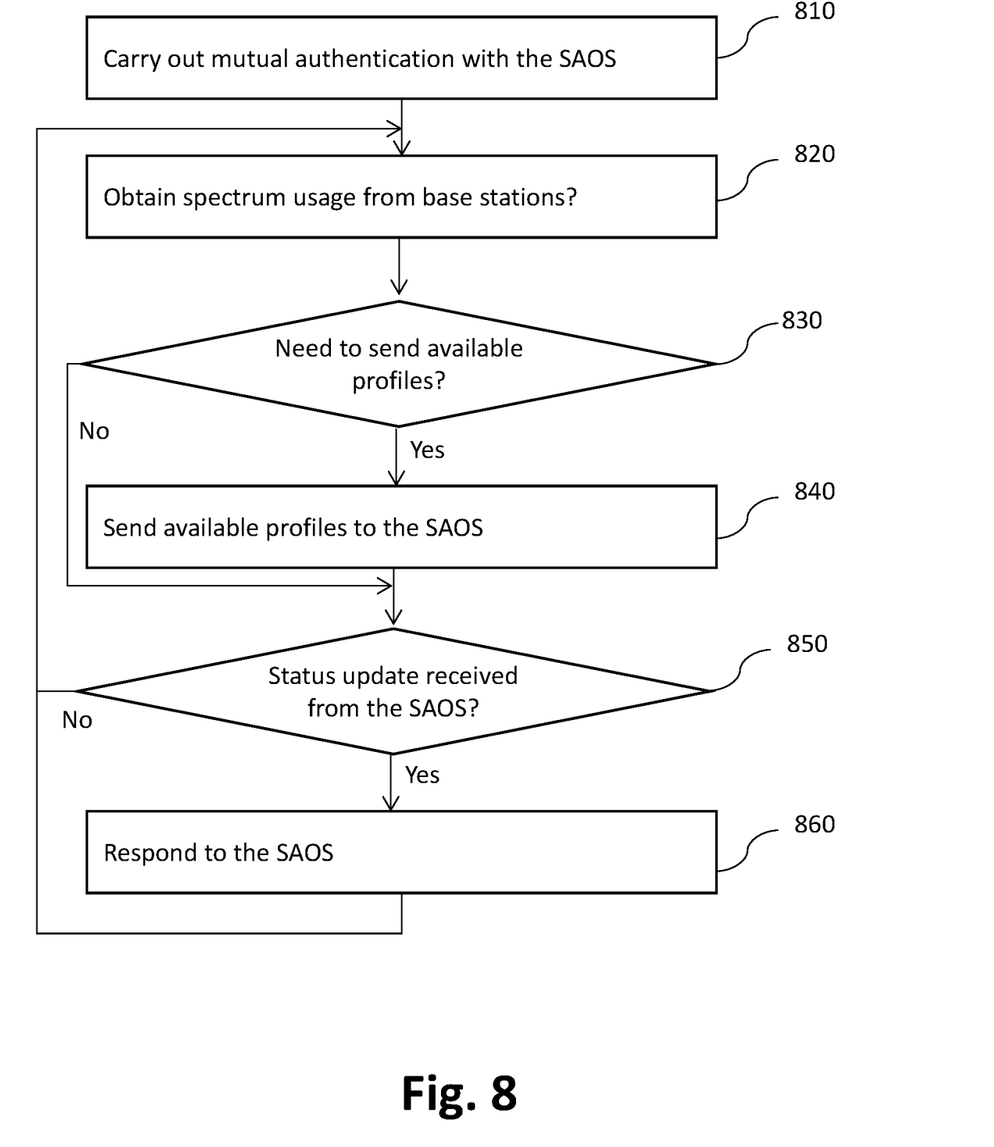
FIG. 8 is a flow chart showing the process at the spectrum owner entity, according to an exemplary embodiment of the present invention.

Referring to FIG. 8 shows the processing carried out by the Spectrum Owner in an example embodiment of the disclosure to maximize the use of the licensed spectrum and the priority-access spectrum dynamically and flexibly. At first, the Spectrum Owner and the spectrum access optimization module 240 can carry out mutual authentication, at step 810. The Spectrum Owner and the spectrum access optimization module 240 can use the Security module 270 to help with authentication and fetching of relevant security information. Upon authentication, the Spectrum Owner entity can obtain spectrum usage information from its Base Stations in each geographic area such as an SMA. In another implementation, the Spectrum Owner entity determines the availability of spectrum based on factors such as spectrum configurations of the Base Stations, traffic demands, and planned services (e.g., broadcast or unicast of pre-recorded multimedia content). The Spectrum Owner entity can then check at the decision box 830 if there is a need to send requested/specified profiles to the SAOS. If a need is there to send the profiles, the Spectrum Owner entity can send the requested/specified profiles to the spectrum access optimization module 240, at step 840. Examples of profiles include Spectrum Profile, Spectrum Access Profile, Time Profile, Cost Profile, Seeker Profile, Interference Profile, Deployment Profile, and Geography Profile.

Upon sending the profiles at step 840 or where there is no need to send the profiles, at step 830, the Spectrum Owner entity can check if it has received a status update from the spectrum access optimization module 240, at step 850. In case, a status update has been received, the Spectrum Owner entity can respond to the spectrum access optimization module 240, at step 860. For example, the Spectrum Owner entity may decide to send one or more updated profiles to the SAOS. The Spectrum Owner may also decide to negotiate with the Spectrum Seeker and send relevant profiles to the SAOS so that the SAOS can record those and forward the profiles to the Spectrum Seeker. However, if no status update is received at decision box 850, the Spectrum Owner entity may continue obtaining the spectrum usage from base stations as in step 820 and the above process can be repeated. Also, upon responding in step 860, the Spectrum Owner entity may continue obtaining the spectrum usage from base stations as in step 820 and the above process can be repeated.

There are significant opportunities for sharing the licensed spectrum between a Terrestrial Network (TN) operator and a Non-Terrestrial Network (NTN) operator. Known or predictable beam coverage of an NTN can be exploited to make use of a given chunk of the spectrum (owned by a TN service provider) in an NTN. Similarly, a certain chunk of the spectrum typically used by an NTN operator may be utilized by a TN operator via suitable coordination. The disclosed system can efficiently utilize such opportunities.

There are also opportunities for sharing the spectrum between scientific users and other users. For example, scientific users make weather and space measurements using designated portions of the spectrum. Such spectrum can potentially be used in some scenarios such as low-power terrestrial communications when the total amount of emissions can be controlled implicitly or explicitly (e.g., using sensors and exclusion zones).

A Mobile Virtual Network Operator (MVNO) can serve its subscribers by making the use of spectrum from multiple satellite system providers or satellite service operators ("NTN operators").

Sharing of the spectrum is not limited to the link between the CD and the BS only. Spectrum can be shared on various links such as backhaul, mid haul, and front haul in addition to the radio interface between the CD and the BS. As mentioned earlier, the spectrum can be shared between a TN user and an NTN user. Coordination between a spectrum user on the ground and a spectrum user on the satellite is needed for spectrum sharing.

In an embodiment of the disclosure, Signal Sensors are optional and the SAOS can work with Spectrum Owners and Spectrum Seekers to coordinate the spectrum usage.

In an example implementation, the SAOS can check Databases to identify locations of fixed receivers to facilitate spectrum sharing among operators utilizing the satellite spectrum. Such databases can include data related to the capabilities of relevant satellites. Time-triggered or time-based protocols can then be utilized to take advantage of known orbit schedules or predictable movements of NTN platforms.

A database of passive user locations and antenna configurations can be exploited to avoid the frequencies that would experience interference.

In an embodiment of the disclosure, the security module allows secure connections among Spectrum Owner, Spectrum Seeker, Databases, Signal Sensors, SAOS, and SAOS Coordinator.

In an embodiment of the disclosure, mobility of users (and NTN platforms where applicable) is considered while estimating the need for spectrum and the availability of spectrum.

In an example implementation of the disclosure, a distributed architecture is used for the SAOS, where a SAOS unit is defined per geographic area such as Spectrum Management Area (SMA). The SMA is a relatively small area such as a city, a county, or a market. In another implementation of the disclosure, a centralized architecture is used for the SAOS, where a single SAOS unit covers a large service area (e.g., a state or a country).

In an embodiment of the disclosure, signal sensors deployed at suitable locations report the Rise over thermal (RoT) or total received signal strength (RSS) per MHz (or another suitable frequency unit) for spectrum chunks (possibly in a compact manner) to the SOAS to enable the SOAS to decide about the number of spectrum seekers that could use the spectrum in a non-exclusive manner in each geographic area within a given period.

In an embodiment of the disclosure, signal sensors report violations of the agreed-upon spectrum usage policy to the SAOS/SAOS Coordinator.

In an embodiment of the disclosure, signal sensors can be mobile. In an example implementation, signal sensors can co-reside with the Base Stations and/or CDs.

In an embodiment of the disclosure, violations, or potential violations of spectrum usage (e.g., via spectrum anomaly detection) are detected by signal sensors, Spectrum Owners, Spectrum Seekers, and/or SAOS. In such cases, spectrum usage anomalies are detected, and suitable reports are recorded to facilitate conformance to the spectrum usage requirements.

In an embodiment of the disclosure, a database includes the acceptable amount of interference based on the system that will be interfered with when the associated spectrum is utilized. Such interference limits can be found experimentally.

In an example implementation of the disclosure, the SAOS creates performance or conformance reports and provides such reports to spectrum owners (and possibly spectrum seekers). These reports include information such as target or allowed RoT and actual RoT and the number of spectrum seekers that are using the non-exclusive spectrum access.

In an example implementation for the Cost Profile, lower and/or upper limits of charges (e.g., maximum bid) may be specified by the Spectrum Owner and Spectrum Seeker. In an example implementation, the Spectrum Owner may specify the minimum charges it is willing to accept from the Spectrum Seeker based on the spectrum characteristics (e.g., frequency bands or chunks and amount of channel bandwidths) and the Seeker Profile. Similarly, the Spectrum Seeker may specify the maximum charges it is willing to pay to the Spectrum Seeker based on the spectrum characteristics (e.g., frequency bands or chunks and amount of channel bandwidths).

In an embodiment of the disclosure, the SAOS considers the minimum charges agreeable to the Spectrum Owner and the minimum charges acceptable to the Spectrum Seeker to determine the Spectrum Owner-Spectrum Seeker matching.

In an example implementation, if the financial aspect of the matching criteria for any Spectrum Seeker is not met with the minimum charges, the SAOS tries the next higher level of charges for Spectrum Seekers using a configurable step size. The SAOS tries to increase the charges up to the limits specified by Spectrum Seekers. If the financial aspect of the matching criteria for any Spectrum Seeker is not met with the maximum acceptable charges for all Spectrum Seekers, the SAOS informs Spectrum Seekers and Spectrum Owners about the need to adjust the limits on charges and guidance on the possible extent of the change needed (e.g., halfway between the minimum charge acceptable to Spectrum Owners and the maximum charge acceptable to Spectrum Seekers). Spectrum Owners can then try to reduce their acceptable charges and Spectrum Seekers can try to increase their acceptable charges.

In an embodiment of the disclosure, the SAOS determines an adaptive limit on the maximum amount of spectrum that can be reserved by one spectrum owner in each geographic area within a given period. The SAOS may change the upper limit on the maximum amount of spectrum based on the demand (e.g., the number of spectrum seekers interested in obtaining given spectrum chunks). In an example implementation, the SAOS specifies the upper limit on the amount of spectrum using a spectrum grant update message.

In an embodiment of the disclosure, the Spectrum Owner may accept, reject, or update the spectrum request received from the SAOS.

In an embodiment of the disclosure, the spectrum owner-the spectrum seeker matching is done by the SAOS based on the latest profiles received by the SAOS. In another embodiment of the disclosure, the spectrum owner-the spectrum seeker matching is done by the SAOS after a negotiation between the spectrum owner and the spectrum seeker about one or more profiles such as the cost profile and the deployment profile.

In an embodiment of the disclosure, roaming agreements between the spectrum owner and the spectrum seeker are supported to enable cost differentiation. For example, there could be a reduced cost for the spectrum seeker when the spectrum owner's subscribers are served by the spectrum seeker's network.

In an embodiment of the disclosure, Secondary Spectrum Access Mode is used, where the spectrum seeker can use a designated specific spectrum chunk anytime if the spectrum seeker does not detect signal energy for a certain period (i.e., detected energy below a threshold). To address the hidden node problem, transmitters can implement the signal detection algorithm. In an example implementation, the spectrum seeker terminates the transmissions within a specified duration upon detection of the signal energy above a threshold.

In an embodiment of the disclosure, the SAOS utilizes an objective function to match the spectrum owner supply with the spectrum seeker demand.

In an embodiment of the disclosure, the BS informs the spectrum seeker about the spectrum needs so that the spectrum seeker can make a request for spectrum to the SAOS.

In an embodiment of the disclosure, the BS reconfigures the radio configuration for one or more compatible CDs to make use of the spectrum obtained by the spectrum seeker from SOAS within the target period. Toward the end of such spectrum usage period, the BS reconfigures such UEs to avoid the use of recently obtained spectrum if the BS has not obtained any overlapping spectrum for the next period.

In an embodiment of the disclosure, the spectrum owner is the cellular service provider, and the spectrum seeker is the NTN service provider. This will enable the NTN service provider to access a large amount of spectrum typically licensed by the terrestrial cellular service provider.

In an embodiment of the disclosure, the spectrum owner is the NTN service provider, and the spectrum seeker is the cellular service provider. This will enable the cellular service provider to access supplemental spectrum typically licensed by the NTN service provider to augment the cellular network capacity when needed.

In an embodiment of the disclosure, the spectrum owner is an NTN service provider, and the spectrum seeker is also an NTN service provider. This will enable NTN service providers to access a larger amount of spectrum individually licensed by both NTN service providers.

In an embodiment of the disclosure, antenna radiation patterns, transmit and receive power levels of the terrestrial and non-terrestrial networks, the NTN platform's orbits, and the NTN platform's coverage area on the Earth's surface area (which could potentially be a function of time) are exploited to facilitate spectrum coordination between the Spectrum Owner and the Spectrum Seeker.

This disclosure facilitates the emergence of new business models. In an example embodiment of the disclosure, the SOAS allows spectrum to be donated to spectrum seekers such as public service networks. The public service networks can offer services in unserved, underserved, and or/poor areas. Spectrum owners can receive tax breaks or other financial incentives from governments.

In another embodiment of the disclosure, SAOS can serve as Spectrum Investment Trust (SIT) like a real estate investment trust (REIT), where the available licensed spectrum is treated like real estate, and the revenue is generated by allocating the available spectrum to one or more spectrum seekers.

In another embodiment of the disclosure, distributed learning such as federated learning is exploited for enhanced security. In an example implementation, the Security Server and the SAOS can work with entities such as Base Stations, CDs, and CN to implement security aspects.

In an embodiment of the disclosure, Databases can be exploited by Base Stations to realize some degree of autonomy and to reduce signaling overhead. For example, market conditions can be utilized to gain access to the spectrum for a very long time (even indefinitely).

In an embodiment of the disclosure, the Spectrum Seeker can use characteristics of the Spectrum Owner's signals to avoid spectrum usage to minimize or eliminate interference.

In an embodiment of the disclosure, to address the error conditions such as the absence of the assignment, a multi-level (e.g., 3-way) signaling message exchange is implemented. A timer can also be used to retransmit a message or detect a failure condition.

What is claimed is:

1. A spectrum coordination system for dynamically maximizing the use of spectrum between spectrum owners and spectrum seekers, the spectrum coordination system comprises a processor and a memory, the processor and the memory are operably coupled to each other, wherein the spectrum coordination system is configured to implement a method comprising:

receiving, by a spectrum access optimization module implemented within the spectrum coordination system and upon execution by the processor, information about availability of spectrum from spectrum owner devices;

receiving, by the spectrum access optimization module, information about requirement of spectrum from spectrum seeker devices;

receiving, by the spectrum access optimization module, profiles from the spectrum owners and profile of the spectrum seekers, the profiles of the spectrum owners comprise characteristics or conditions associated with spectrum usage by the spectrum seekers, the profiles of the spectrum seekers comprise characteristics or conditions associated with spectrum usage accepted by the spectrum seekers;

generating, by the spectrum access optimization module, spectrum owner-spectrum seeker pairs for allocation of an available spectrum chunk to one or more spectrum seekers;

providing, by the spectrum access optimization module, status updates to the spectrum owners and the spectrum seekers, wherein the status updates are for allocation of the available spectrum chunk; and determining, by the spectrum access optimization module, a number of spectrum seekers that could use a predetermined spectrum in a non-exclusive manner in each geographic area within a given period based on spectrum utilization reports, wherein the information about the number of spectrum seekers is used to generate the spectrum owner-spectrum seeker pairs.

2. The spectrum coordination system according to claim 1, wherein the spectrum coordination system further comprises signal sensors, the signal sensors configured to provide the spectrum utilization reports to the spectrum access optimization module, wherein the spectrum utilization reports comprise rise over thermal (RoT) or total received signal strength (RSS) per MHz for spectrum chunks.

3. The spectrum coordination system according to claim 1, wherein the method further comprises:
classification, by the spectrum access optimization module, of the spectrum seekers for differentiated billing and differentiated spectrum grant per spectrum usage conditions of the spectrum owners.

4. The spectrum coordination system according to claim 1, wherein the profiles comprise spectrum profile, spectrum access profile, time profile, cost profile, seeker profile, interference profile, deployment profile, and geography profile.

5. The spectrum coordination system according to claim 4, wherein the deployment profile specifies a type of network deployment where an acquired spectrum can be used by a spectrum seeker, the spectrum access profile specifies exclusive access or non-exclusive access of the acquired spectrum by the spectrum seeker, the interference profile comprises an interference model, the cost profile comprises charges for the spectrum, the spectrum profile comprises details of the spectrum chunks potentially available to spectrum seekers, the time profile specifies period during which the spectrum can be used by the spectrum seeker, seeker/owner profile specifies classification of spectrum seeker/owner, the geography profile identifies geographic area where the spectrum can be accessed.

6. The spectrum coordination system according to claim 1, wherein the method further comprises:
creating a database, the database comprises: information about legacy users of a band, information about passive receivers of a band, information about NTN platform's orbital parameters including ephemeris data, orbital parameters/orbital models, and information about capabilities of predetermined satellites.

7. The spectrum coordination system according to claim 1, wherein the method further comprises:
facilitating negotiation between the spectrum owners and the spectrum seekers; and
updating the respective profiles based on the negotiations.

8. The spectrum coordination system according to claim 1, wherein the method further comprises:
sharing the available spectrum chunk between a Terrestrial Network and a Non-terrestrial Network (NTN).

9. The spectrum coordination system according to claim 1, wherein the method further comprises:
sharing the available spectrum chunk between scientific users and other users.

10. The spectrum coordination system according to claim 1, wherein the method further comprises:
sharing the available spectrum chunk between a spectrum owner and a spectrum seeker that operates a community network or a public service network.

11. The spectrum coordination system according to claim 1, wherein the method further comprises:
sharing the available spectrum chunk on a communication link between a communication device and a base station or between two entities of a network, wherein the two entities comprises two parts of a Base Station, a Base station part and a non-radio Network Function, and two non-radio Network Functions.

12. A method for dynamically maximizing use of spectrum between spectrum owners and spectrum seekers, the method implemented within a system comprising a processor and a memory, the processor and the memory are operably coupled to each other, wherein the method comprising the steps of:
receiving, by a spectrum access optimization module implemented within the system and upon execution by the processor, information about availability of spectrum from spectrum owner devices;
receiving, by the spectrum access optimization module, information about requirement of spectrum from spectrum seeker devices;
receiving, by the spectrum access optimization module, profiles from the spectrum owners and profiles from the spectrum seekers, the profiles of the spectrum owners comprise characteristics or conditions associated with spectrum usage by the spectrum seekers, the profiles of the spectrum seekers comprise characteristics or conditions associated with spectrum usage accepted by the spectrum seekers;
generating, by the spectrum access optimization module, spectrum owner-spectrum seeker pairs, based on the profiles for allocation of an available spectrum chunk to one or more spectrum seekers;
providing, by the spectrum access optimization module, status updates to the spectrum owners and the spectrum seekers, wherein the status updates are for allocation of the available spectrum chunk; and
providing, by the signal sensors, spectrum utilization reports to the spectrum access optimization module, wherein the spectrum utilization reports comprise rise over thermal (RoT) or total received signal strength (RSS) per MHz for spectrum chunks.

13. The method according to claim 12, wherein the method further comprises:
determining, by the spectrum access optimization module, a number of spectrum seekers that could use a predetermined spectrum in a non-exclusive manner in each geographic area within a given period based on the spectrum utilization reports, wherein the information about the number of spectrum seekers is used to generate the spectrum owner-spectrum seeker pairs.

14. The method according to claim 12, wherein the method further comprises:
classification, by the spectrum access optimization module, of the spectrum seekers for differentiated billing and differentiated spectrum grant per spectrum usage conditions of the spectrum owners.

15. The method according to claim 12, wherein the profiles comprise spectrum profile, spectrum access profile, time profile, cost profile, seeker profile, interference profile, deployment profile, and geography profile.

16. The method according to claim 15, wherein the deployment profile specifies a type of network deployment where an acquired spectrum can be used by a spectrum seeker, the spectrum access profile specifies exclusive access or non-exclusive access of the acquired spectrum by the spectrum seeker, the interference profile comprises an interference model, the cost profile comprises charges for the spectrum, the spectrum profile comprises details of the spectrum chunks potentially available to spectrum seekers, the time profile specifies period during which the spectrum can be used by the spectrum seeker, seeker/owner profile specifies classification of spectrum seeker/owner, the geography profile identifies geographic area where the spectrum can be accessed.

17. The method according to claim 12, wherein the method further comprises:
   creating a database, the database comprises: information about legacy users of a band, information about passive receivers of a band, information about NTN platform's orbital parameters including ephemeris data, orbital parameters/orbital models, and information about capabilities of predetermined satellites.

18. The method according to claim 12, wherein the method further comprises:
   facilitating negotiation between the spectrum owners and the spectrum seekers; and
   updating the respective profiles based on the negotiations.

19. A spectrum coordination system for dynamically maximizing the use of spectrum between spectrum owners and spectrum seekers, the spectrum coordination system comprises a processor and a memory, the processor and the memory are operably coupled to each other, wherein the spectrum coordination system is configured to implement a method comprising:
   receiving, by a spectrum access optimization module implemented within the spectrum coordination system and upon execution by the processor, information about availability of spectrum from spectrum owner devices;
   receiving, by the spectrum access optimization module, information about requirement of spectrum from spectrum seeker devices;
   receiving, by the spectrum access optimization module, profiles from the spectrum owners and profile of the spectrum seekers, the profiles of the spectrum owners comprise characteristics or conditions associated with spectrum usage by the spectrum seekers, the profiles of the spectrum seekers comprise characteristics or conditions associated with spectrum usage accepted by the spectrum seekers;
   generating, by the spectrum access optimization module, spectrum owner-spectrum seeker pairs for allocation of an available spectrum chunk to one or more spectrum seekers;
   providing, by the spectrum access optimization module, status updates to the spectrum owners and the spectrum seekers, wherein the status updates are for allocation of the available spectrum chunk; and
   classification, by the spectrum access optimization module, of the spectrum seekers for differentiated billing and differentiated spectrum grant per spectrum usage conditions of the spectrum owners.

\* \* \* \* \*